United States Patent [19]

Nakajima et al.

[11] Patent Number: 5,005,144

[45] Date of Patent: Apr. 2, 1991

[54] SIGNAL PROCESSING SYSTEM FOR FLOW VELOCITY IN LASER DOPPLER VELOCIMETER

[76] Inventors: Tsuyoshi Nakajima, 3-19 Mefuyamate, Takarazuka-shi, Hyogo-ken; Yuji Ikeda, Maison de Cascade Rokko 205, 111-1 Miyasaka, Suishashindenaza, Nada-ku, Kobe-shi, Hyogo-ken, both of Japan

[21] Appl. No.: 378,098

[22] Filed: Jul. 10, 1989

[51] Int. Cl.$^5$ .................................................. G01P 3/36
[52] U.S. Cl. ..................................... 364/565; 364/510; 356/28.5
[58] Field of Search ..................... 364/565, 510, 486; 356/28.5

[56] References Cited

U.S. PATENT DOCUMENTS

| | | | |
|---|---|---|---|
| 3,777,133 | 12/1973 | Beck et al. | 364/510 |
| 3,824,015 | 7/1974 | Petit et al. | 364/565 |
| 3,842,252 | 10/1974 | Jakeman et al. | 364/510 |
| 4,019,038 | 4/1977 | Critten et al. | 364/510 |
| 4,244,026 | 1/1981 | Dickey, Jr. | 364/565 |
| 4,596,254 | 6/1986 | Adrian et al. | 356/28.5 X |
| 4,843,564 | 6/1989 | Jenson | 364/510 |

OTHER PUBLICATIONS

Adrian, "High Speed Correlation Techniques", TSI Quarterly, pp. 3-9, 1982.
Matovic et al., "Frequency Estimation of LDA Signals by Model Parameter Estimation," Proceedings: The Use of Computers in Laser Velocimetry, ISL, 22-1-2-2-7, 1987.
Adrian et al., "Correlation and Spectrum of Doppler Signal Zero Crossings Using a Photon Correlation Computer," J. Phys. E. Sci. Instru., 21, 743-748 (1988).
Radke et al., "Fluid Flow Investigations in Rotating Axial Pump Impellers Using a Burst-Spectrum Analyzer," 1988 (supported by Technical University of Berlin).

Primary Examiner—Parshotam S. Lall
Assistant Examiner—S. A. Melnick
Attorney, Agent, or Firm—Thompson, Hine and Flory

[57] ABSTRACT

A period of a correlation signal from a laser Doppler velocimeter is calculated from crossing points at which a correlation function crosses over a threshold level by clipping and digitizing a Doppler burst signal, thereby enabling an accurate and real time measurement to be made of a flow velocity, even in low SNR Doppler signals. Smoothing the waveform of a correlation signal further improves measurement accuracy. When the threshold level is set to be the ½ value of the autocorrelation function at $\tau=0$, a crossing point is precisely detected even in an uneven correlation function or small amplitude of the crosscorrelation function, thus further increasing measurement accuracy.

17 Claims, 8 Drawing Sheets

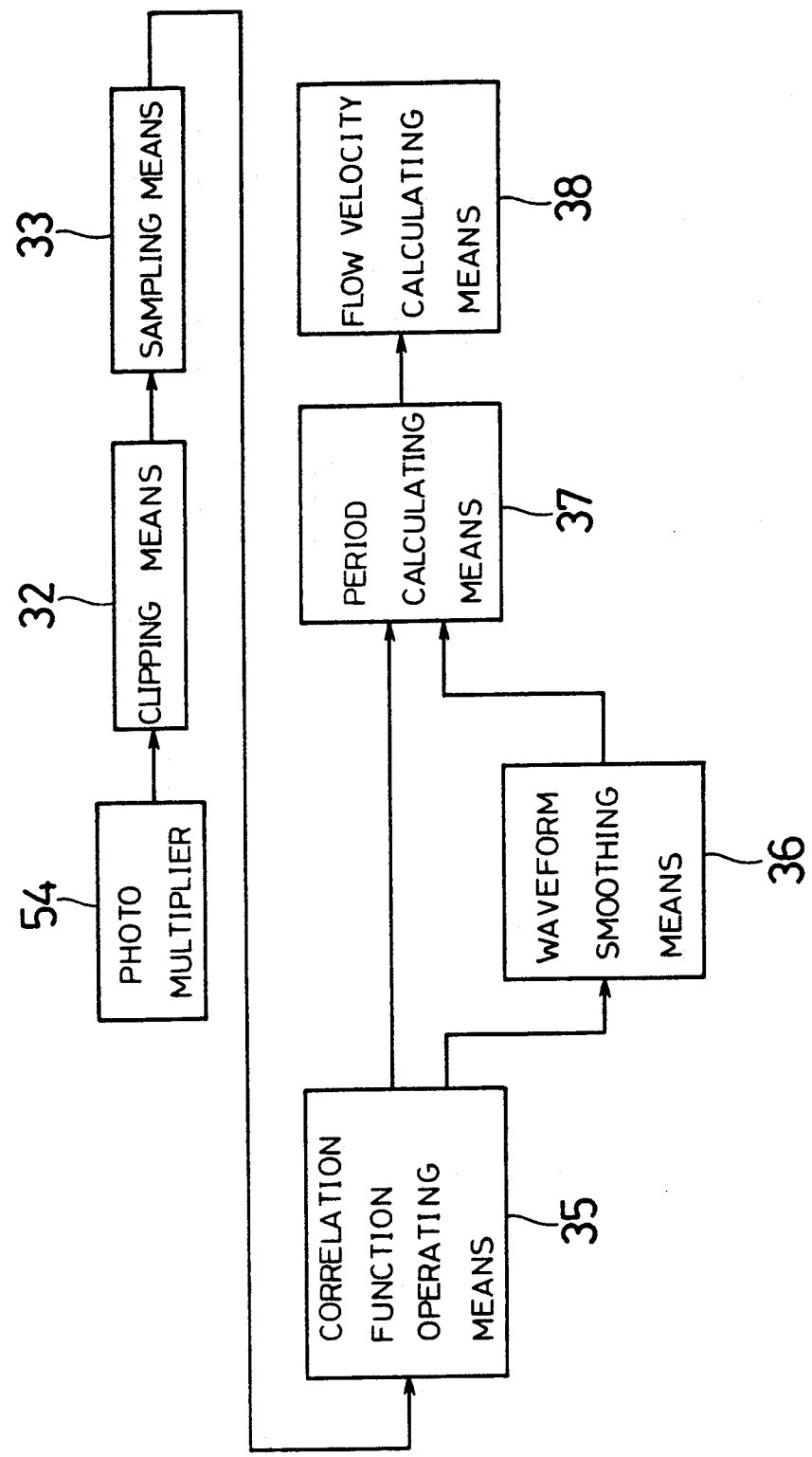

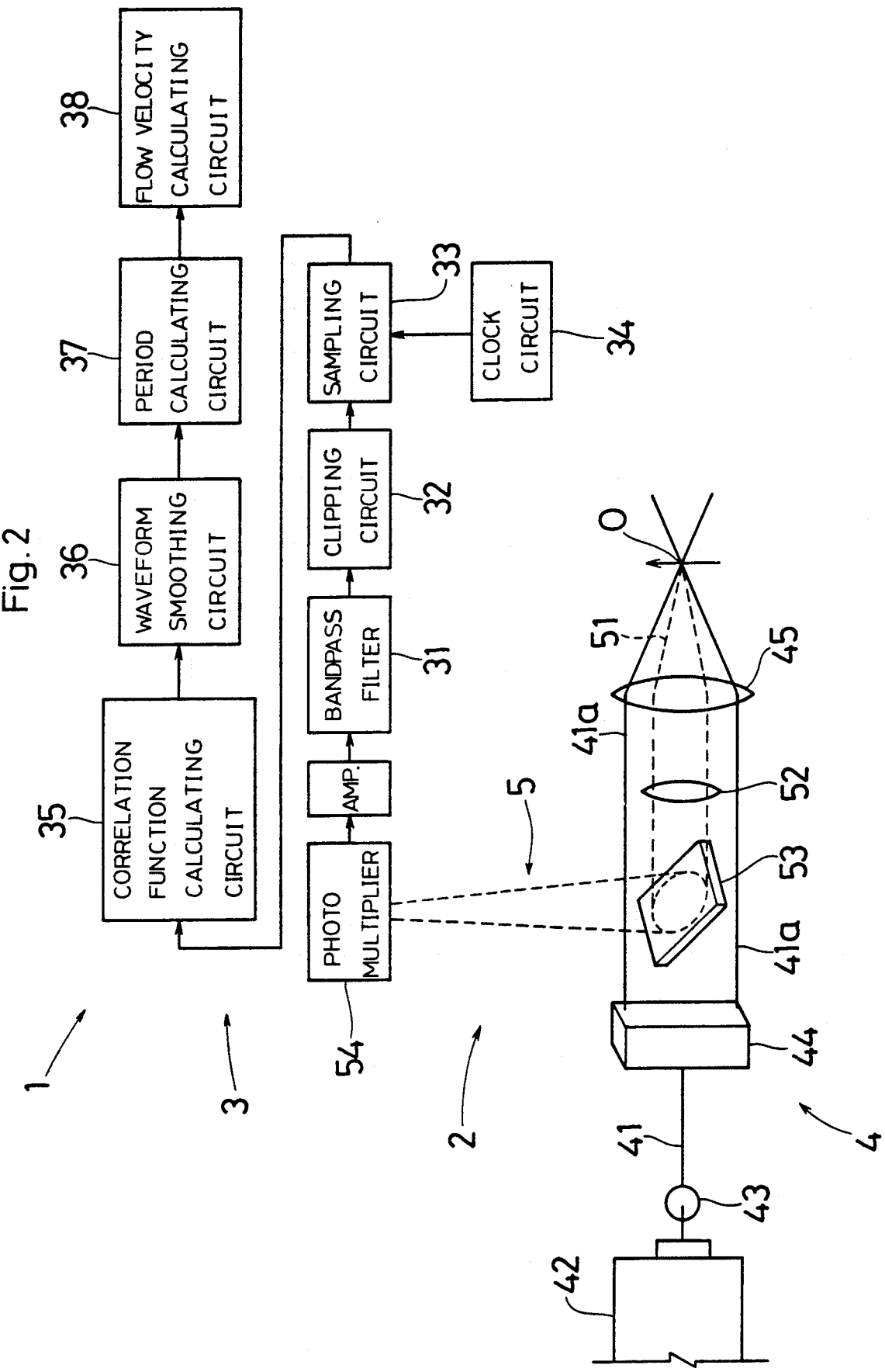

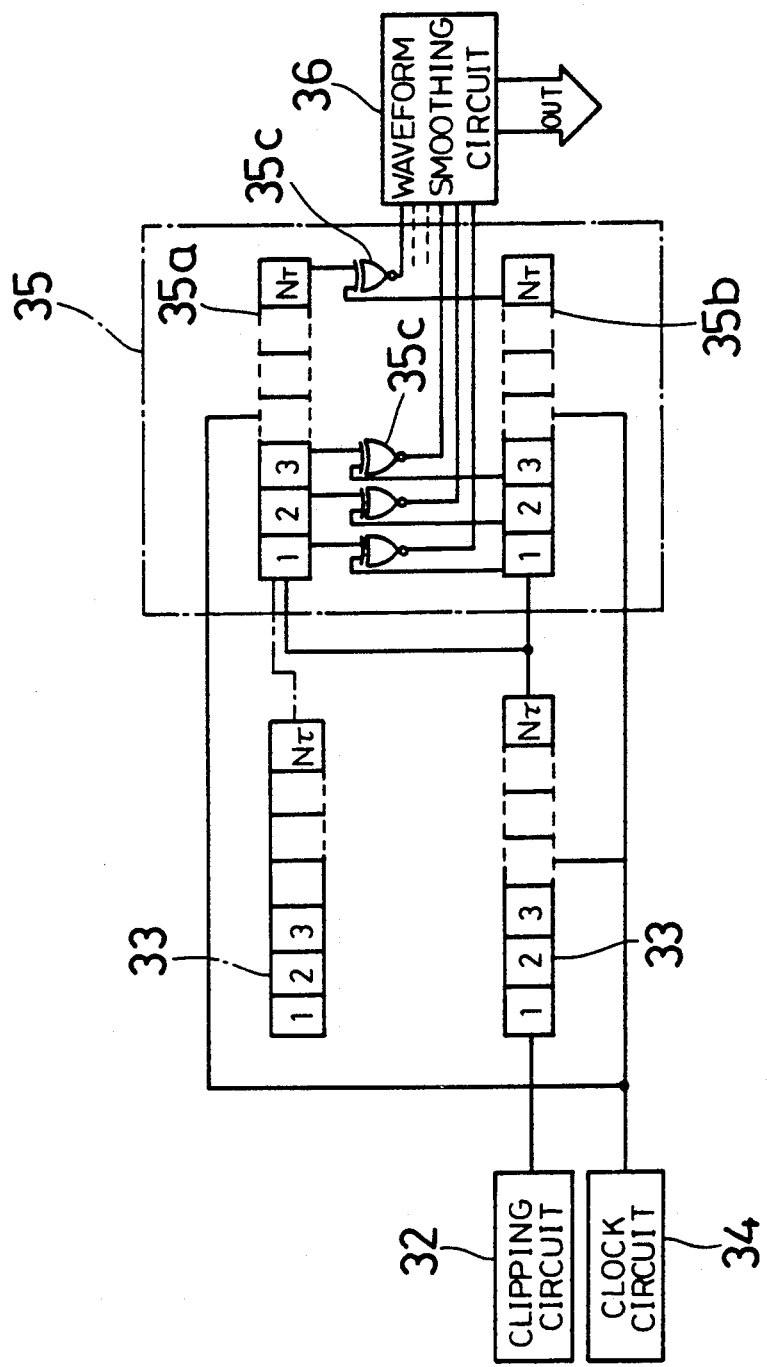

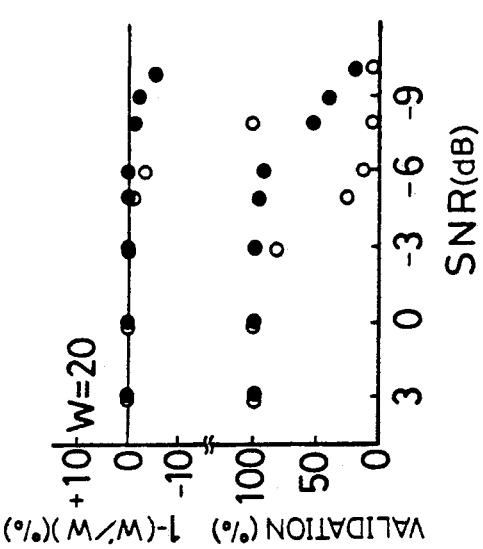
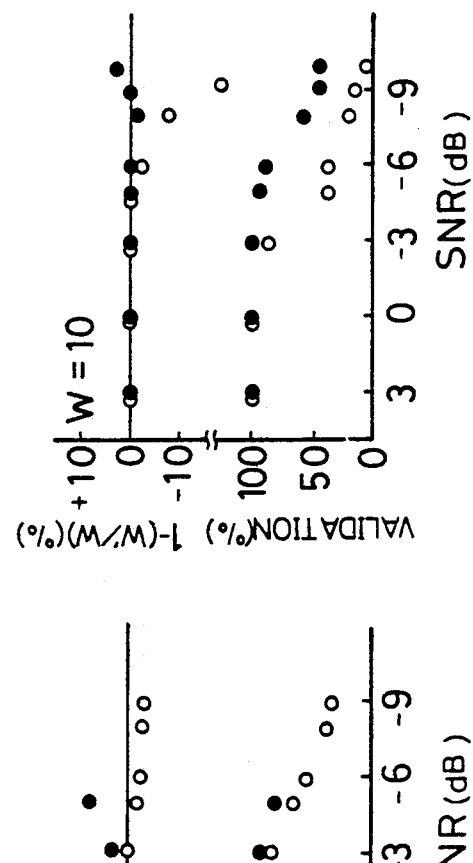
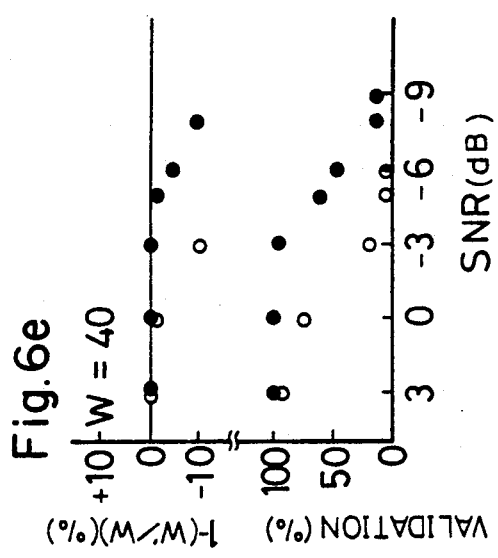
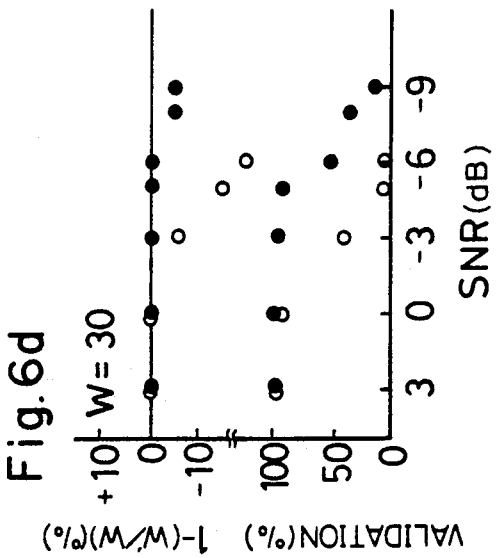

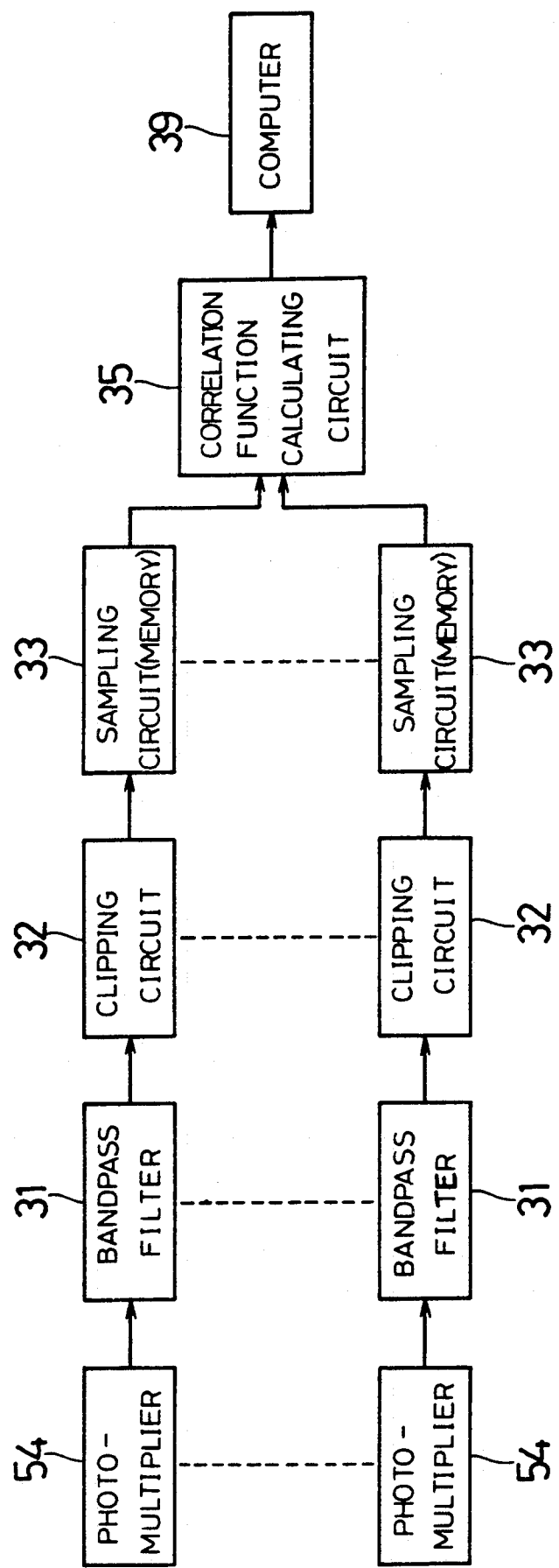

SIGNAL PROCESSING SYSTEM FOR FLOW VELOCITY IN LASER DOPPLER VELOCIMETER

BACKGROUND OF THE INVENTION (a) Field of the Invention

This invention relates to a flow velocity measurement processor for a laser Doppler velocimeter which utilizes the interference of a laser beam to measure, for example, a flow velocity. More particularly, this invention relates to a signal processing system for Doppler burst signals.

(b) Description of the Prior Art

Generally, in laser Doppler velocimeters, a laser beam is divided at a beam splitter into two beams and focused with a lens. A particle, traveling through interference fringes at the measuring point, causes light scattering. The scattered light, by way of the focusing apparatus, is received at a photomultiplier wherein the scattered light is transformed into a Doppler burst signal. Then, to obtain a flow velocity of the particle, the Doppler burst signal is processed by a signal processing system.

Conventionally, counters or trackers are used for this signal processing system. Counters measure the number of periods of an input frequency with a built-in clock and then calculate its reciprocal number to obtain a Doppler frequency. On the other hand, trackers use a Phase-Locked-Loop(PLL) by which an input frequency and a frequency of a built-in voltage controlled oscillator(VCO) are kept at a constant level. Thus, a Doppler frequency is obtained from this tracking frequency. As the Doppler frequency is proportional to the velocity of the particle, both counters and trackers calculate the flow velocity from the Doppler frequency.

The above-mentioned Doppler burst signal consists of various kinds of noise such as shot noise or white noise. This means that the laser Doppler velocimeters employing counters or trackers for the signal processing system can not measure the flow velocity from the Doppler signal with low signal-to-noise ratio(SNR). In other words, there is a limitation of the measurable range for this type of laser Doppler velocimeter. Furthermore, both counters and trackers have another disadvantage; in counters, time dependent data required to obtain vortex scales in a turbulent flow are not available, while the analog processing employed in trackers makes its application for measurements in a high turbulent flow with low particle density impossible.

SUMMARY OF THE INVENTION

The principle object of this invention is to realize an accurate and real time measurement of the flow velocity from a Doppler burst signal even with low SNR by digitizing the Doppler burst signal to obtain a correlation function and then by calculating the period of the correlation function.

To attain the above-mentioned object, this invention comprises a series of component means as shown in FIG. 1. Means provided in this invention are: clipping means for receiving a Doppler burst signal from the photomultiplier of a laser Doppler velocimeter and digitizing the Doppler burst signal by clipping it at a fixed level to output a pulse signal; sampling means for receiving the pulse signal from the clipping means and sampling the pulse signal with a pre-set clock signal to output a digitized pulse signal; digital correlation function calculating means for receiving the digitized pulse signal from the sampling means and calculating the correlation function of the digitized pulse signals to output a correlation signal; period calculating means for receiving the correlation signal from the digital correlation function calculating means and by detecting the points at which the correlation signal crosses over a pre-set threshold level, and by using the triangular wave of the autocorrelation functions the period and frequency of the Doppler signals is calculated based on the crossing points; and flow velocity calculating means for calculating the flow velocity of a measuring object from the frequency calculated at the period calculating means.

In the above arrangement, for example, in differential types of laser Doppler velocimeters, two laser beams are focused at a measurement volume to form an interference fringe. When a measuring object, for instance, a particle, passes through the interference fringe, light scattering is induced. The scattering light is collected at the photomultiplier. A Doppler burst signal is obtained from the scattering light. Then, the Doppler burst signal is clipped at a fixed level and digitized to produce a pulse signal at the clipping means. The pulse signal is next transmitted to the sampling means wherein the pulse signal is sampled in relation to a pre-set clock signal to output a digitized pulse signal. This digitized pulse signal is sent to the digital correlation function calculating means wherein the correlation function of the digitized pulse signal or autocorrelation function is calculated to output a correlation signal having a triangular wave.

The correlation signal or a smoothed correlation signal is received at the period calculating means. Here, the crossing points are detected when the correlation function signal crosses over the pre-set threshold level to calculate the period of the correlation signal. Finally, as this period of the correlation signal corresponds to that of the Doppler burst signal, the flow velocity calculating means calculates the flow velocity of the particle from the frequency calculated at the period calculating means.

The procedure mentioned above makes possible an accurate flow velocity measurement even for low SNR Doppler signals and hence significantly improves measurement accuracy as compared with conventional methods. A wide range of velocity measurement is achieved with this method.

Compared with the conventional counters and trackers, this invention achieves an accurate real-time measurement even within the high turbulent flow of low particle density.

In a preferred embodiment, the autocorrelation function signal obtained from the digital correlation function calculating means is smoothed at a waveform smoothing means, then transmitted to the period calculating means to provide the frequency. The wave smoothing means is effective in reducing the error caused by the miscounting of uneven signals.

BRIEF DESCRIPTION OF THE DRAWING

FIG. 1 shows a block diagram of this invention.

FIGS. 2 to 10 show a preferred embodiment of the invention. A schematic layout of the laser Doppler velocimeter is shown in FIG. 2.

A schematic diagram of the digital correlation function calculating circuit is illustrated in FIG. 3.

FIGS. 4-(a), (b), (c), (d) show waveform transformation of a Doppler burst signal, a clipped pulse signal, a sampled pulse signal, and a correlation signal.

FIGS. 5-(a), (b), (c), (d) show waveforms extracted from the result of an actual experiment, respectively of a Doppler burst signal, a sampled pulse signal, a correlation signal and a smoothed correlation signal.

FIGS. 6-(a), (b), (c), (d), (e) show characteristic performances of measurement errors and validations(-VAL) under different conditions of input frequency ratio W(the ratio of a sampling frequency to a Doppler frequency).

Figure 7A:
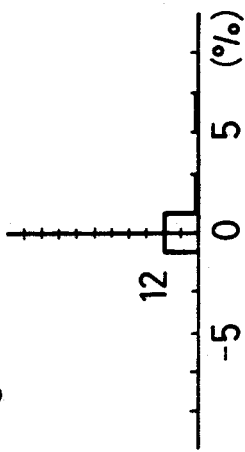
Figure 7B:
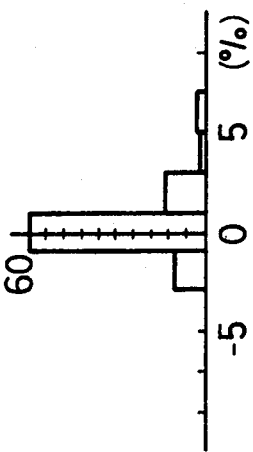

FIG. 7 (a) shows the histogram of original data and (b) shows the histogram of smoothed data.

Figure 4A:
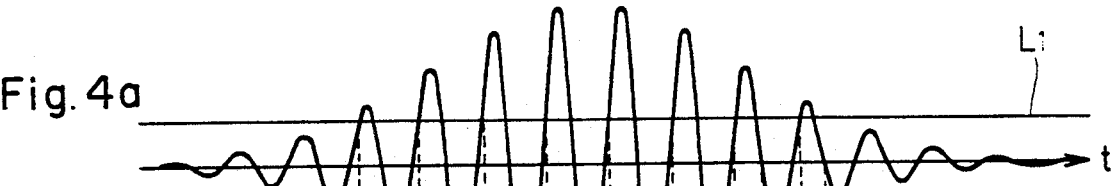
Figure 4B:
Figure 4C:
Figure 4D:
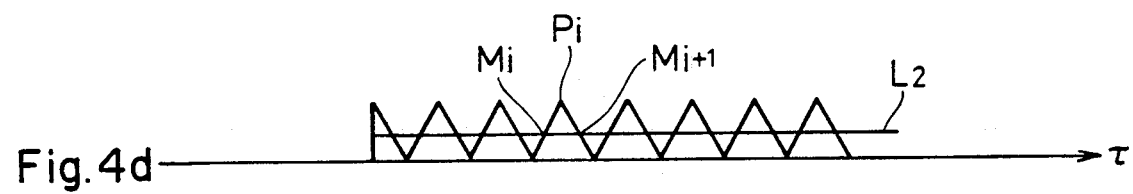
Figure 5A:
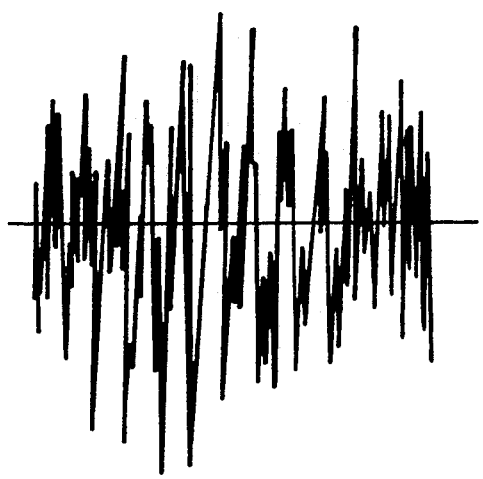
Figure 5B:
Figure 5C:
Figure 5D:
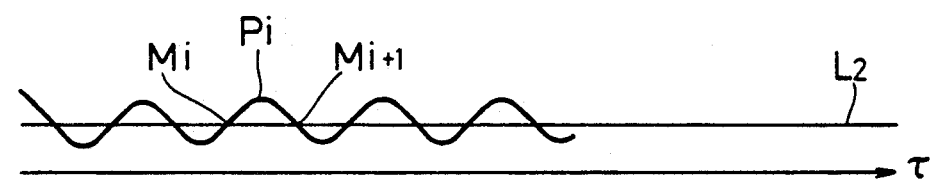
Figure 8:
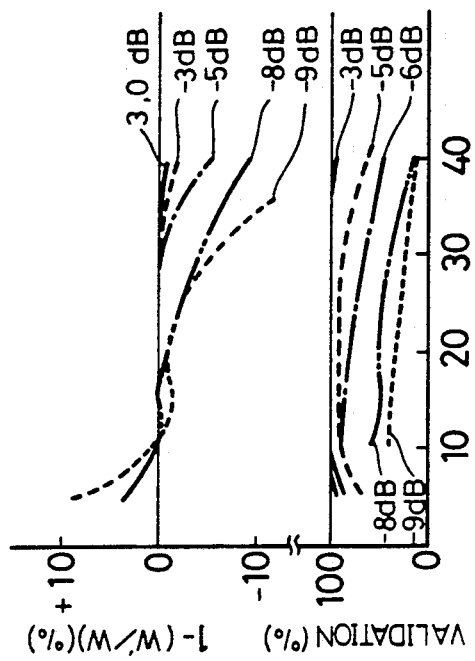

FIG. 8 shows error estimation and validations of measurement under different conditions when a smoothing technique is used.

Figure 9:
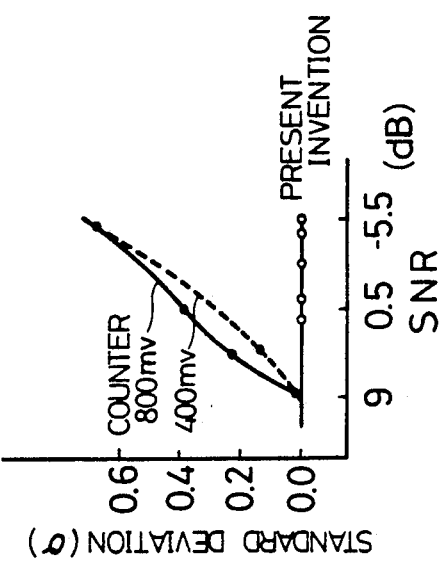

FIG. 9 shows the standard deviations obtained in this invention compared with conventional methods.

FIG. 10 is a block diagram showing a further embodiment of the invention.

DESCRIPTION OF THE PREFERRED EMBODIMENT

A description is made below of a preferred embodiment of the present invention, with reference to the accompanying drawings.

Referring now particularly to FIG. 2 of the drawings, reference numeral 1 designates a laser Doppler velocimeter used for measuring a flow velocity, e.g. in internal combustion engines or gas-turbine combustors using the coherence characteristic of laser beam.

The laser Doppler velocimeter 1 is composed of a differential-type optical system 2 for incidenting and receiving light such as laser beams and scattering light, and a signal processing system 3 for processing a Doppler burst signal obtained from the optical system 2. The optical system 2, adopting the backscatter mode, is composed of a laser beam focusing means 4 and a scattering light receiving means 5. Laser beam focusing means 4 includes a laser light source 42, a half-wave plate 43 for adjusting polarization direction of laser beam 41, a beam splitter 44 for splitting one laser beam adjusted by the half-wave plate 43 into two parallel beams 41a, 41a, and a focusing lens 45 for focusing beam 41a at a measuring point O. In this arrangement, two beams 41a, 41a interfere with each other and create interference fringes at the crossing point O. The passing of a particle traveling in air or liquid through the interference fringes causes scattering light 51.

The scattering light receiving means 5 for receiving and photo-electrically converting the scattering light 51 includes a focusing lens 52 for focusing the scattering light 51, a reflector 53 for adjusting the propagation direction of the scattering light 51 focused through the focusing lens 52, and a photomultiplier 54 for converting the scattering light 51 into an electric signal to output a Doppler burst signal. The frequency of this Doppler burst signal of the scattering light is proportional to the velocity of the particle.

The signal processing system 3, as shown in the waveform transformation diagram of FIG. 4, calculates a particle velocity based on the frequency of the Doppler burst signal. The signal processing system 3 first sends the Doppler burst signal obtained from the photomultiplier 54 to a bandpass filter 31 wherein only the Doppler burst signal of the fixed frequency band is extracted to eliminate noise. Then the signal processing system 3 outputs the Doppler burst signal shown in FIG. 4 (a) to a clipping circuit 32 of the clipping means. The clipping circuit 32 begins its signal processing when the pedestal or envelope of the Doppler burst signal crosses over a pre-set threshold level $L_1$. Setting the threshold level higher than zero leads to an elimination of noise. The Doppler burst signal is digitized by the clipping circuit 32 and the digitized signal is sent to the sampling circuit 33 of the sampling means. In detail, the digitized signal is started when the Doppler burst signal reaches the threshold level $L_1$, and stopped when the Doppler burst signal reaches level 0.

The sampling circuit 33 as shown in FIG. 3 consists of shift registers and is connected with a clock circuit 34 which outputs, for example, a clock signal of 500 MHz. The clock signal of 500 MHz is used to sample the pulse signal at a fixed period at the sampling circuit 33 to output the pulse signal shown in FIG. 4 (c) to a digital correlation function calculating circuit 35 (a summing network) of the digital correlation function calculating means.

The digital correlation function calculating circuit 35 calculates the autocorrelation function $R(\tau)$ of the pulse signal and outputs a correlation signal of the triangular wave shown in FIG. 4 (d) to a waveform smoothing circuit 36 of the waveform smoothing means. The digital correlation function calculating circuit 35 as shown in FIG. 3 consists of a first shift register 35a and a second shift register 35b, and exclusive-NOR circuits 35c corresponding to the bit number of the shift registers lag time 35a and 35b. The shift registers 35a and 35b, for example, 64 bits in capacity, are connected to the shift registers of the sampling circuit 33 in series. The exclusive-NOR circuits 35c responds to the output signal from each bit of both registers 35a and 35b, and then outputs a logic signal to the waveform smoothing circuit 36.

The waveform smoothing circuit 36, in processing a low SNR Doppler burst signal, smoothes an uneven correlation signal to reduce the miscounting error due to noise, and outputs a smoothed correlation signal to a period calculating circuit 37 of the period calculating means. Here, the SNR is defined as, $$SNR = 20 \cdot \log(0.47 \cdot A/\alpha) \quad (1)$$

where
A: maximum amplitude of a Doppler burst signal
0.47·A: effective value of a Doppler burst signal
$\alpha$: effective value of noise.

The waveform smoothing circuit 36 uses the moving average method to smooth the uneven correlation signal, by averaging three consecutive correlation values $R(t-1)$, $R(t)$, $R(t+1)$ of the original autocorrelation function $\overline{R}(t)$ as expressed in the equation;

$$\overline{R}(t) = \{R(t-1) + R(t) + R(t+1)\}/3 \quad (2)$$

The period calculating circuit 37 shown in FIG. 4 (d) calculates the period of the triangular waveform of the smoothed correlation signal from the crossing points when the smoothed correlation signal crosses over the pre-set threshold level $L_2$, to output the calculated period to a flow velocity calculating circuit 38 of the flow velocity calculating means. More specifically, the period calculating circuit 37 calculates a peak position $P_i$ from the mean value $(M_i + M_{i+1})/2$ which is obtained by averaging two crossing points $M_i$, $M_{i+1}$ where the smoothed correlation signal and the threshold level $L_2$ meet, and then calculates the period of the smoothed correlation signal by counting peak position Pi. The threshold level $L_2$ of the period calculating circuit 37 is set to be the half value of $R(0)$ which indicates the value of the autocorrelation function at $\tau=0$ ($\tau$: delay time) and corresponds to the sample number $N_T$ of the correlation function calculation. Setting the threshold level $L_2$ at the half value of $R(0)$ is a powerful tool because the probability that the output from each bit of the shift registers 35a and 35b of the digital correlation function calculating circuit 35 becomes 0—0 or 1—1, and the probability the output becomes 0—1 or 1—0 are both ¼. That is, the autocorrelation function of a white noise has its value of $R(0)/2(=N_T/2)$. Consequently, the threshold level $L_2$ is set to be $R(0)/2$.

Furthermore, the period calculating circuit 37 is designed to determine the validation(VAL) of the calculated period. VAL is given by;

$$VAL = |1-(S_2/S_1)| \text{ and } |1-(S_n/S_1)| \qquad (3)$$

where
$S_1$: period calculated from the first triangular wave
$S_2$: period calculated from the second triangular wave
$S_n$: period calculated from the last triangular wave.
The period calculating circuit 37 determines whether VAL satisfies the equation, $$VAL < \beta \qquad (4)$$

where,
$\beta$: fixed tolerance.

Finally, the flow velocity calculating means 38 calculates the frequency f based on the following equation since the frequency of the smoothed correlation function corresponds to the frequency f of the Doppler burst signal.

$$f = (\vec{V}/\lambda) \cdot (\vec{k_1} - \vec{k_2}) \qquad (5)$$

where
$\lambda$: wavelength of laser beam
$\vec{k_1}$: unit vector of the moving direction of the first laser beam
$\vec{k_2}$: unit vector of the moving direction of the second laser beam.

Although this preferred embodiment includes the waveform smoothing circuit 36, when the noise level is low, the digital correlation signal can be sent directly to the period calculating means 37 from the correlation function calculating circuit 35, bypassing the waveform smoothing circuit 36.

Referring now to the actual results of experiments performed, the principle of flow velocity measurement through the laser Doppler velocimeter 1 is discussed.

Laser beam 41 from the laser light source 42 first passes the half-wave plate 43 wherein the polarizing direction of the laser beam is adjusted. Laser beam 41 is split at the beam splitter 44 into two parallel beams 41a and 41a. Then the laser beams 41a and 41a are focused at the measuring point O by the focusing lens 45. When a particle passes through the measuring point O, the scattering light 51 appears. The scattering light 51 is collected at the photomultiplier 54 by the focusing lenses 45, and 52 and the reflector 53. Then, the photomultiplier 54 converts the scattering light and outputs the Doppler burst signal.

The following descriptions concern the processing of the Doppler burst signal by referring to the waveform in FIG. 5.

Generally, the Doppler burst signal consists of a noise. When the pedestal component is totally eliminated, the Doppler burst signal is;

$$B(t) = A \cdot \exp[-\{(2\sqrt{2} \cdot t)/W \cdot Nf\}^2] \cdot \cos\{(2\pi \cdot t/W) + \phi\} \qquad (6)$$

where
$B(t)$: Doppler burst signal
t: the time made dimensionless by the sampling period
A: constant representing amplitude
W: the ratio of the sampling frequency to the Doppler frequency (hereinafter "input frequency ratio")
Nf: fringe number
$\phi$: phase delay.

FIG. 5 (a) shows the Doppler burst signal obtained by adding white noise generated artificially into the equation (6). Each waveform in FIG. 5 shows the result of an experiment under the conditions of, SNR=−3 dB, W=20, Nf=12, A=1.0, trigger level $L_1$=0.3, lag time $N_T$=128, and $N_\tau$ (maximum delay time)=128. This Doppler signal is filtered at the bandpass filter 31. Using the pedestal component of the Doppler burst signal as a trigger, the clipping circuit 32 clips and digitizes the Doppler burst signal at a fixed level to output the pulse signal (Refer to FIG. 4 (b)). Then the sampling circuit 33 samples the pulse signal at a constant period in relation to the clock signal of the clock circuit 34, to output a fixed number of the pulse signal, as shown in FIG. 5 (b). At this time, together with other pulse signals, pulse signals consisting of noise are shown in FIG. 5 (b) with the mark Z.

After this processing, the digital correlation function calculating circuit 35 receives the pulse signal and calculates autocorrelation $R(\tau)$ of the digital pulse signal and then outputs the correlation signal as shown in FIG. 5 (c). Because this correlation signal of triangular wave is uneven due to noise, the waveform smoothing circuit 36 smoothes the correlation signal with the moving average method represented by the equation (2). In this way, the waveform smoothing circuit 36 outputs a smoothed autocorrelation function as shown in FIG. 5 (d).

After receiving the smoothed correlation signal from the waveform smoothing circuit 36, the period calculating circuit 37 calculates the period of the correlation signal by detecting a crossing point $M_i$ on the threshold level when the threshold level $L_2$ is set to be the half value of the autocorrelation function $R(0)$, and by calculating and counting peak position Pi of the correlation signal. Then, the period calculating circuit 37 determines VAL of the correlation signal by using equation (4). When VAL satisfies the equation (4), the flow velocity calculating circuit 38 calculates a particle velocity V by using equation (5) based on the frequency obtained at the period calculating circuit 37.

FIGS. 6 (a), (b), (c), (d), (e) represent numerical data acquired by the laser Doppler velocimeter 1. In FIG. 6 (a), (b), (c), (d), (e), the input frequency ratio W was respectively set at 5, 10, 20, 30, and 40. The horizontal axis represents SN ratio and the vertical axis represents the accuracy and VAL(%). This accuracy is expressed by the value of error of output against input, represented by the equation $1-(W'/W)$, where W' in the equation indicates the ratio of the sampling frequency to the Doppler frequency calculated by the period calculating circuit 37 (hereinafter "measured frequency ratio"). In FIG. 6, white circles show the original data, and black circles show the smoothed data.

As obviously seen in FIG. 6, measurement error of less than 3% and VAL of over 80% are achieved within the range of input frequency ratio W of 10 to 20 and SNR of more than −6 dB. Considering the fact that measurement error is usually 16% (not shown in the figure) at 0 dB of SNR in conventional methods, this demonstrates the significant improvement of accuracy achieved by this invention.

FIGS. 7-(a), (b) are histograms indicating the number of validations, obtained out of 100 experimental data, which satisfied equation (4) under the condition of SNR=−6 dB, W=20, Nf=12. In FIG. 7, (a) shows validations when original data were used and (b) when smoothing technique was adopted. Average measured frequency ratio W' and standard deviation $\sigma$ are, 19.31, 1.74 in (a) and 19.91, 0.65 in (b) respectively. FIG. 7 verifies that the waveform smoothing through the waveform smoothing circuit 36 results in further improvement of the measurement accuracy.

FIG. 8 shows error estimation and VAL at different SNR when the waveform smoothing technique was adopted. It is clear from FIG. 8 that over 65% of VAL is achieved to process the Doppler burst signal with SNR of more than −6 dB when the input frequency ratio W is within the range of 5 to 40. In other words, with a clock signal of 500 MHz, a Doppler burst signal of 12.5 to 100 MHz can be processed. Furthermore, over 45% of VAL is achieved to process the Doppler burst signal of −10 dB with an input frequency ratio W of 10 to 20. This means that, with a clock signal of 500 MHz, a Doppler burst signal of 25 MHz to 50 MHz can be processed.

FIG. 9 shows the relationship between standard deviation $\sigma$ and SNR, compared with the conventional prior art methods. White circles represent values for this invention and black circles represent values for the conventional counter method. FIG. 9 shows that this invention has lowered a standard deviation and considerably improved measurement accuracy.

Thus, this invention first digitizes a Doppler burst signal for calculating a digital correlation and then calculates a period of the triangular waveform of the autocorrelation function from crossing points at which the correlation function and the threshold level $L_2$ meet. This has led to considerably improved measurement accuracy over the conventional methods because even the flow velocity of low SNR Doppler burst signal can be measured precisely by this invention. Another advantage is the wider range of flow velocity measurement due to the increased dynamic range in this invention.

Compared with the conventional counters and trackers, this invention makes possible a real time measurement and highly accurate velocity measurement even when encountering turbulent flow with low particle density.

Moreover, the waveform smoothing technique applied to the correlation signal realizes an even more accurate calculation of the frequency, thereby increasing the overall accuracy of the measurement.

It should further be noted that as the period calculating means 37 sets the threshold level $L_2$ at ½ of the value of autocorrelation R(0), crossing points can be reliably detected, thus improving measurement accuracy.

This preferred embodiment is provided with single optical system 2, receiving scattering light 51 from one direction, to obtain a flow velocity through an autocorrelation function. However, it is readily apparent for those who are skilled in the art that, by receiving scattering light 51 from two different angles, a particle diameter and a flow velocity of a particle can be measured simultaneously in real time by obtaining phase difference from the crosscorrelation function. When the scattering light is collected at different angles, the phase delay between the Doppler signals appears, which has the characteristic of being proportional to the particle diameter at the measurement volume. In order to obtain the velocity and particle diameter simultaneously, the crosscorrelation of these two Doppler signals are digitized by using the same method described above. The output triangular waveforms of the crosscorrelation function provide the phase delay. The first peak of the correlation function is shifted proportionally to the phase delay, thus, obtaining the first peak position and calculating the period of the correlation signals. Thus, the simultaneous measurement of velocity and particle diameter can be realized.

In practice, after processing the signals of the two scattered lights at different angles by the photomultiplier 54, the bandpass filter 31 and the clipping circuit 32, this embodiment inputs the pulse signal to each shift register 35a, 35b of the digital correlation function calculating circuit 35 by means of the sampling circuit 33 to calculate the crosscorrelation function, as shown in the alternate long and short dashed lines of FIG. 3. By using this method, for example, the diameter of a particle of engine fuel can be measured in real time.

In addition to one-point flow velocity measurement method employed in the preferred embodiment, another method of, for example, multiple point measurements detecting vortex pattern of the turbulent flow can be adopted. When applying this method, the time and spatial correlation in the flow is necessary for the measurement. This means that the velocity at multiple points in space should be measured simultaneously to obtain a spatial correlation and time-space correlation. Formerly, for multiple point measurements, a number of processors were required and a very large system had to be established to process the data to provide velocity and turbulence at each measuring point to obtain time-space correlation distributions. This invention is applicable for the multiple measurements wherein a compact and easily controllable system may be used. This is because, for instance, when measuring the flow velocity at 10 points simultaneously, as seen in FIG. 10, only one computer 39 including the correlation function calculating circuit 35 is required while 10 respective circuits of the photomultiplier 54, the bandpass filter 31, the clipping circuit 32 and the sampling circuit 33 are necessary. As shown in FIG. 10, signals from 10 photomultipliers are filtered at each bandpass filter 31, and then digitized at each clipping circuit 32. Signals are next sent to each sampling circuit 33 where data of velocity and time are stored in memory. Information from each circuit is processed by one correlator and one computer 39 by operating the correlation function calculating circuit 35 with a multiplexer. In this way, only one correlation function calculating circuit 35 and one computer 39 are needed to operate multiple point velocity measurements. Thus the overall system furnishes compactness and reduced cost, and system control becomes simple. In this embodiment, if the IC is operated at 17

MHz, 256 bits of data can be processed at a data rate of 88.5 KHz. When 10 respective processors of the photomultiplier 54, the bandpass filter 31, the clipping circuit 32, the sampling circuit 33 are connected in parallel, the data rate for one series of processors becomes approximately 8 KHz, dividing 88.5 KHz over ten. This data rate of 8 KHz is sufficient for real time measurement because the actual data rate of the Doppler burst signals is less than 1 KHz.

Instead of the backscatter mode employed in these embodiments discussed here, the forward scattering mode, or a reference light type, or a single beam type may be used alternatively for the optical system 2.

It is also noted that the sampling circuit 33 and the digital correlation function calculating circuit 35 are not restricted to the shift registers. Likewise, the method of moving averages employed at the processing of the waveform smoothing circuit 36 is not restricted to the method of three correlation functions averaging. Other known techniques may be selected.

What is claimed is:

1. A flow velocity measurement processor for a laser Doppler velocimeter, comprising:
   clipping means for receiving a Doppler burst signal obtained from a photomultiplier of a laser Doppler velocimeter and digitizing the Doppler burst signal by clipping it at a fixed level to output a pulse signal;
   sampling means for receiving the pulse signal from the clipping means and sampling the pulse signal with a pre-set clock signal to output a digitized pulse signal;
   digital correlation function calculating means for receiving the digitized pulse signal from the sampling means and calculating a correlation function of the digitized pulse signal to output a correlation signal;
   period calculating means for receiving the correlation signal from the digital correlation function calculating means and detecting a crossing point at which the correlation signal crosses over a pre-set threshold level and calculating the period of the correlation signal based on the crossing point to provide a frequency of the correlation signal; and
   flow velocity calculating means for calculating the flow velocity of a measuring object based on the frequency from the period calculating means.

2. The flow velocity measurement processor according to claim 1 further comprising waveform smoothing means for receiving the correlation signal from the digital correlation function calculating means and smoothing the correlation signal to output a smoothed correlation signal to the period calculating means.

3. The flow velocity measurement processor according to claim 1 wherein said clipping means includes a bandpass filter to extract the Doppler burst signals of a fixed frequency band from signals obtained from the photomultiplier.

4. The flow velocity measurement processor according to claim 1 wherein the clipping means begins signal processing when the pedestal or envelope of the Doppler burst signal crosses over a pre-set threshold level.

5. The flow velocity measurement processor according to claim 1 wherein said sampling means for sampling the pulse signal with the clock signal comprises shift registers and a clock circuit which outputs the clock signal of a fixed frequency.

6. The flow velocity measurement processor according to claim 1 wherein the digital correlation function calculating means comprises shift registers and exclusive-NOR circuits corresponding to the bit number of the shift registers.

7. The flow velocity measurement processor according to claim 1 wherein the period calculating means comprises counting peak positions averaged from two crossing points where the correlation signal crosses over the threshold level set to be $\frac{1}{2}$ value of the autocorrelation function of $\tau=0$.

8. The flow velocity measurement processor according to claim 1 wherein said period calculating means determines the validation of the calculated period.

9. A flow velocity measurement processor according to claim 1 wherein said period calculating means sets a threshold level of $\frac{1}{2}$ of the sampling number of the correlation function calculated at the digital correlation function calculating means.

10. The flow velocity measurement processor according to claim 2 wherein said waveform smoothing means utilizes the moving averages method to smooth the correlation signal.

11. The flow velocity measurement processor according to claim 1 wherein:
   said clipping means includes a bandpass filter to extract the Doppler burst signals of a fixed frequency band from signals obtained from the photomultiplier and wherein said clipping means begins signal processing when the pedestal or envelope of the Doppler burst signal crosses over a pre-set threshold level;
   said sampling means for sampling the pulse signal with the clock signal comprises shift registers and a clock circuit which outputs the clock signal of a fixed frequency;
   said digital correlation function calculating means comprises shift registers and exclusive-NOR circuits corresponding to the bit number of the shift registers; and
   said period calculating means sets a threshold level of $\frac{1}{2}$ of the sampling number of the correlation function calculated by said digital function calculating means, counts peak positions averaged from two crossing points where the correlation signal crosses over said threshold level and determines the validation of the calculated period.

12. The flow velocity measurement processor according to claim 2 wherein;
   said clipping means includes a bandpass filter to extract the Doppler burst signals of a fixed frequency band from signals obtained from the photomultiplier and wherein said clipping means begins signal processing when the pedestal or envelope of the Doppler burst signal crosses over a pre-set threshold level;
   said sampling means for sampling the pulse signal with the clock signal comprises shift registers and a clock circuit which outputs the clock signal of a fixed frequency;
   said digital correlation function calculating means comprises shift registers and exclusive-NOR circuits corresponding to the bit number of the shift registers;
   said period calculating means sets a threshold level of $\frac{1}{2}$ of the sampling number of the correlation function calculated by said digital function calculating means, counts peak positions averaged from two crossing points where the correlation signal crosses over said threshold level and determines the validation of the calculated period; and said waveform smoothing means smoothes the correlation signal by using the moving average method.

13. The flow velocity measurement processor according to claim 1 wherein the Doppler burst signal received by the clipping means is a signal comprising noise obtained from the photomultiplier of the laser Doppler velocimeter which has a differential type optical system.

14. The flow velocity measurement processor according to claim 1 wherein said clipping means and said sampling means comprise a plurality of clipping means and sampling means.

15. The flow velocity measurement processor according to claim 14 wherein two clipping means and two sampling means are provided.

16. The flow velocity measurement processor according to claim 2 wherein said clipping means and said sampling means comprise a plurality of clipping means and sampling means.

17. The flow velocity measurement processor according to claim 16 wherein two clipping means and two sampling means are provided.

* * * * *

UNITED STATES PATENT AND TRADEMARK OFFICE
CERTIFICATE OF CORRECTION

PATENT NO. : 5,005,144

DATED : April 2, 1991

INVENTOR(S) : Nakajima et al.

It is certified that error appears in the above-identified patent and that said Letters Patent is hereby corrected as shown below:

ON THE TITLE PAGE: Item [30]

-- Foreign Application Priority Data
    January 11, 1989 [JP]   Japan..............1-5092

Signed and Sealed this

Thirteenth Day of October, 1992

Attest:

DOUGLAS B. COMER

Attesting Officer      Acting Commissioner of Patents and Trademarks